United States Patent
Brandenburger et al.

(10) Patent No.: US 10,056,983 B2
(45) Date of Patent: Aug. 21, 2018

(54) QUANTUM-ASSISTED LOAD BALANCING IN COMMUNICATION-CONSTRAINED WIDE-AREA PHYSICAL NETWORKS

(71) Applicant: NEW YORK UNIVERSITY, New York, NY (US)

(72) Inventors: Adam Brandenburger, New York, NY (US); Pierfrancesco La Mura, New York, NY (US)

(73) Assignee: NEW YORK UNIVERSITY, New York, NY (US)

( * ) Notice: Subject to any disclaimer, the term of this patent is extended or adjusted under 35 U.S.C. 154(b) by 0 days.

(21) Appl. No.: 15/528,685

(22) PCT Filed: Nov. 24, 2015

(86) PCT No.: PCT/US2015/062508
§ 371 (c)(1),
(2) Date: May 22, 2017

(87) PCT Pub. No.: WO2016/086042
PCT Pub. Date: Jun. 2, 2016

(65) Prior Publication Data
US 2017/0272174 A1    Sep. 21, 2017

Related U.S. Application Data

(60) Provisional application No. 62/083,835, filed on Nov. 24, 2014.

(51) Int. Cl.
*H04B 10/00*    (2013.01)
*H04K 1/00*    (2006.01)
(Continued)

(52) U.S. Cl.
CPC ............ *H04B 10/70* (2013.01); *H04B 10/50* (2013.01); *H04B 10/66* (2013.01)

(58) Field of Classification Search
CPC ......... H04B 10/50; H04B 10/66; H04B 10/70
(Continued)

(56) References Cited

U.S. PATENT DOCUMENTS 6,468,159 B1 * 10/2002 La Mura ................ G06Q 30/02
                                                    273/429
7,333,611 B1 *  2/2008 Yuen ...................... H04B 10/70
                                                    380/256

(Continued)

FOREIGN PATENT DOCUMENTS

EP    1 833 009 A1    9/2007
EP    1833009 A1 *    9/2007    ......... G06Q 20/3823

OTHER PUBLICATIONS

Landry et al; Tools for quantum repeaters: quantum teleportation, independent sources of entangled photons and entanglement purification; 2010 pp. 1-103.*

(Continued)

*Primary Examiner* — Amritbir Sandhu
(74) *Attorney, Agent, or Firm* — Foley & Lardner LLP (57) ABSTRACT

The availability of entangled quantum signals can improve distributed decision making. In particular, it can improve the efficiency of coordination and the ability to perform load balancing in high-speed wide-area networks, and other communication-constrained network environments. We include an application to high-frequency trading on geographically-separated financial markets, and we discuss load balancing in IT and electrical networks and also a battlefield scenario.

14 Claims, 8 Drawing Sheets

(51) Int. Cl.
*H04B 10/70* (2013.01)
*H04B 10/50* (2013.01)
*H04B 10/66* (2013.01)

(58) Field of Classification Search
USPC .......... 398/140, 152; 708/250–256; 380/256
See application file for complete search history.

(56) References Cited

U.S. PATENT DOCUMENTS

| | | | | |
|---|---|---|---|---|
| 7,660,533 B1* | 2/2010 | Meyers | ............... | H04B 10/70 380/255 |
| 7,844,649 B2* | 11/2010 | Fiorentino | ............. | B82Y 10/00 708/255 |
| 8,103,172 B2* | 1/2012 | Peters | ............... | H04L 9/0855 398/140 |
| 8,503,885 B2* | 8/2013 | Meyers | ............... | B82Y 10/00 380/256 |
| 8,897,449 B1* | 11/2014 | Broadbent | ........... | H04L 9/0891 380/277 |
| 8,983,303 B2* | 3/2015 | Meyers | ............... | H04B 10/11 398/140 |
| 9,270,385 B2* | 2/2016 | Meyers | ............... | B82Y 10/00 |
| 9,294,191 B2* | 3/2016 | Peters | ................... | H04B 10/70 |
| 2003/0133714 A1 | 7/2003 | Gat | | |
| 2007/0064945 A1 | 3/2007 | Yuan et al. | | |
| 2009/0180616 A1* | 7/2009 | Brodsky | ............... | H04B 10/70 380/256 |
| 2010/0057622 A1 | 3/2010 | Faith et al. | | |
| 2010/0111541 A1* | 5/2010 | Trojek | ................ | G02F 1/3526 398/152 |
| 2010/0226659 A1 | 9/2010 | Nishioka et al. | | |
| 2010/0258746 A1* | 10/2010 | Na | ........................ | B82Y 10/00 250/493.1 |
| 2011/0075839 A1* | 3/2011 | Noh | .................... | H04L 9/0858 380/44 |
| 2012/0076503 A1 | 3/2012 | Habif | | |
| 2013/0087766 A1* | 4/2013 | Schenkel | ............ | G06N 99/002 257/31 |
| 2015/0055961 A1* | 2/2015 | Meyers | ................ | B82Y 10/00 398/140 |
| 2016/0028542 A1* | 1/2016 | Choi | ..................... | H04B 10/85 380/28 |
| 2017/0174064 A1* | 6/2017 | Shinoda | ................. | B60K 1/04 |

OTHER PUBLICATIONS

Ingaki et al; Entanglement distribution over 300Km of fiber; Oct. 2013; OSA; pp. 23241-23249.*

* cited by examiner

|  | Type of signal | | | |
|---|---|---|---|---|
| Type of decision problem | None or perfectly correlated | i.i.d. | Exchangeable | Quantum |
| Perfect-recall Kuhn | ▨ | ▨ | ▨ | ▨ |
| Imperfect-recall Kuhn | ▨ | ▦ | ▨ | ▦ |
| Isbell | ▨ | ▨ | ░ | ■ |

Figure 8

QUANTUM-ASSISTED LOAD BALANCING IN COMMUNICATION-CONSTRAINED WIDE-AREA PHYSICAL NETWORKS

CROSS-REFERENCE TO RELATED APPLICATIONS

This application claims the benefit of U.S. Provisional Application No. 62/083,835 filed on Nov. 24, 2014, which is hereby incorporated by reference in its entirety.

BACKGROUND OF THE INVENTION

Wide-area physical networks may be communication-constrained because communication may be possible but too slow or too costly. A case where communication would be too slow is that of high-speed physical networks as used in high-frequency trading in financial markets and other electronic marketplaces, and in load balancing on IT and electrical networks. The "cost" for communication should be broadly considered as not just capital but also opportunity or risk exposure. For example, a case in which communication would be too costly is a battlefield scenario where any broadcast, even encrypted, could disclose a unit's location to the enemy.

In high-speed networks, advances in communications technology and data processing have enabled a dramatic increase in the speed and volume of the overall transactions which can be handled. Such increases in speed and volume, in turn, have introduced new problems of load balancing. So-called "flash crashes," which at times have occurred in financial markets and other electronic marketplaces, and in IT and electrical networks, are extreme examples of the instability that can be introduced by the ill-coordinated activity of high-frequency automated traders or bidders, or of high-capacity core routers.

In financial trading, high-frequency transactions among broadly separated locations must be executed so quickly that direct communication among those locations is, even at the speed of light, sometimes too slow to be useful. This inability to communicate in a timely fashion has the potential to cause an unbalanced allocation of traders to markets. In particular, it can be that, in a small time interval, too many traders decide to sell the same asset on the same market, whereas with more effective coordination they could have distributed themselves across separate markets, in order to reach more buyers per seller.

Similar problems arise in the context of IT and electrical networks, where a core router—at the moment of deciding on which of various alternative routes to transmit the next packet—cannot coordinate its decisions with other routers through direct communication, because of the severe overhead and delay that such communication would impose on the network. This, again, leads to problems of high-speed load balancing, which if left unresolved can make the operations of the network unstable, or inefficient (as one must plan for extra capacity to reduce said instability).

Hence, there is a need for an improved communication system and method for enabling more effective load balancing of buyers and sellers across separate markets, in the cases of trading on electronic marketplaces, of traffic in IT and electrical networks, and in battlefield coordination.

SUMMARY OF THE INVENTION

The foregoing summary is illustrative only and is not intended to be in any way limiting. In addition to the illustrative aspects, embodiments, and features described above, further aspects, embodiments, and features will become apparent by reference to the following drawings and the detailed description.

In one embodiment, quantum bits are generated and distributed to different locations. Each agent, located at the different locations, observes his/her local information. A corresponding quantum detector in each location is configured in a way that depends on the local information. For example, in an optical implementation, a polarized filter set at an angle which depends on local information. Next, the quantum bit is measured through the configured detector and the outcome is recorded. Next, an action is taken by the agent depending on the local information and the outcome of the measurement.

One embodiment relates to a computer-assisted quantum communication system for facilitating communication-constrained distributed decision making. The system comprises a quantum signal transmitter configured to transmit a carrier of quantum information. A quantum signal receiver is provided in communication with the quantum signal transmitter. A qubit generator is provided in communication with the quantum transmitter. The system further includes a processor and a tangible computer-readable medium operatively connected to the processor and including computer code. The computer code is configured to: process the carrier of quantum information, identify the outcome of the measurement of a quantum state of carrier of quantum information, and determine an action based upon the outcome.

Another embodiment relates to a system for the facilitation of communication-constrained distributed decision making, including high-speed trading, bidding, and routing. A quantum signal transmitter is provided. A plurality of quantum receivers are included, one for each user location, capable of measuring the outcome of each quantum bit. A plurality of quantum channels are provided, capable of distributing entangled quantum bits to each of the quantum receivers on location. Users execute strategies depending on the local information of each user and on the outcome of measurement at the respective location.

Another embodiment relates to a method of providing correlated information at separate locations. A pair of entangled quantum carriers is generated. A first entangled quantum carrier is transmitted to a first quantum detector at a first location. A second entangled quantum carrier is transmitted to a second quantum detector at a second location separate from the first location. A quantum state of the first entangled quantum carrier is determined. First location locale information is also determined. A quantum state of the second entangled quantum carrier is determined. Second location locale information is also determined. An action based upon the first entangled quantum carrier quantum state and the first location local information is determined. An action based upon the second entangled quantum carrier quantum state and the second location local information is determined. The first entangled quantum carrier quantum state and the second entangled quantum carrier quantum state are correlated.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

One embodiment relates to the facilitation of high-frequency trading, comprising a plurality of trader locations and a plurality of quantum channels, capable of distributing entangled quantum bits to separate trader locations. A system for the temporary storage of said quantum bits can be included. Configurable quantum detectors at each location are included that are capable of measuring the outcome of each quantum bit. A further embodiment relates to a method for allocating trades to markets, depending on the private information of each trader (e.g., which asset the trader intends to offer for sale) and on the outcomes of measurement at the respective locations.

DETAILED DESCRIPTION OF THE PREFERRED EMBODIMENTS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Described herein are systems and methods for utilizing quantum communication in conjunction with logical instructions for providing useful coordination in distributed network scenarios. Communication in networks may be constrained by speed or cost. In the case of high-frequency trading on financial markets, even the physical limit of the speed of light is operative. (See Wissner-Gross, A., and C. Freer, "Relativistic Statistical Arbitrage," *Physical Review E*, 82, 2010, 056104.) In one embodiment, the present invention utilizes quantum communication techniques and systems alone or in combination with classical communication techniques and systems. Quantum communication utilizes entangled quantum bits, which may be located at widely separated locations, in order to improve the efficiency of decentralized high-speed strategies, such as over wide-area networks. The implementation requires the novel physical coupling of a wide-area classical communication-constrained network (for example, two financial traders at distant locations) with a wide-area quantum communication network.

In one embodiment, the quantum communication network includes a quantum communication center and at least two quantum channels. The simplest such quantum communication network links a quantum communication center with just two user locations, though it should be appreciated more complicated networks are possible utilizing a larger number of quantum communication channels. One architecture for a quantum communication network comprises a quantum communication center, sending entangled quantum bits to multiple user locations (referred to as a "star" configuration), but other configurations are also possible. The quantum information may be transmitted by "wired" (e.g., fiber optics) or "wireless" (e.g., laser). Embodiments that rely entirely on quantum communication provide the benefit of avoiding the use of classical communications and their inherent downsides. However, in one embodiment, quantum teleportation techniques allow the combined use of classical and quantum communication channels in order to teleport a (potentially unlimited) sequence of quantum bits to given locations using an initial 'founder' ensemble (e.g., an entangled quantum bit pair). In this embodiment, if a complementary classical communication network (e.g., the Internet) is available, not all quantum bits need to be physically moved from a central location to all others.

In one embodiment, each quantum bit (or qubit, a two-state quantum-mechanical system) is encoded in the spin of a photon. It should be appreciated that alternative embodiments may use an acceptable quantum information carrier to encode the qubit. Quantum information carriers include elementary particles, composite particles, protons, electrons, atoms, molecules, nanostructures, electron holes and quasi-particles. Each photon is delivered to a separate user location, by means of wireless transmission (which may be focused or directional such as a laser, or wide area broadcast, such as by satellite) or wired transmission, such as optical fiber. Furthermore, each photon is identified and indexed by its time of arrival at the relevant location. Each configurable quantum detector comprises a single-photon detector, and a polarized filter which can be set at different angles depending on the private information of the respective user on location. Described herein is a method which, in the simple scenario of two financial traders and three assets, demonstrates how the availability of entangled quantum bits allows for coordinated trading strategies which yield a higher expected payoff for the traders than can be obtained by means of any choice of classical (non-quantum) coordination devices.

Figure 1:
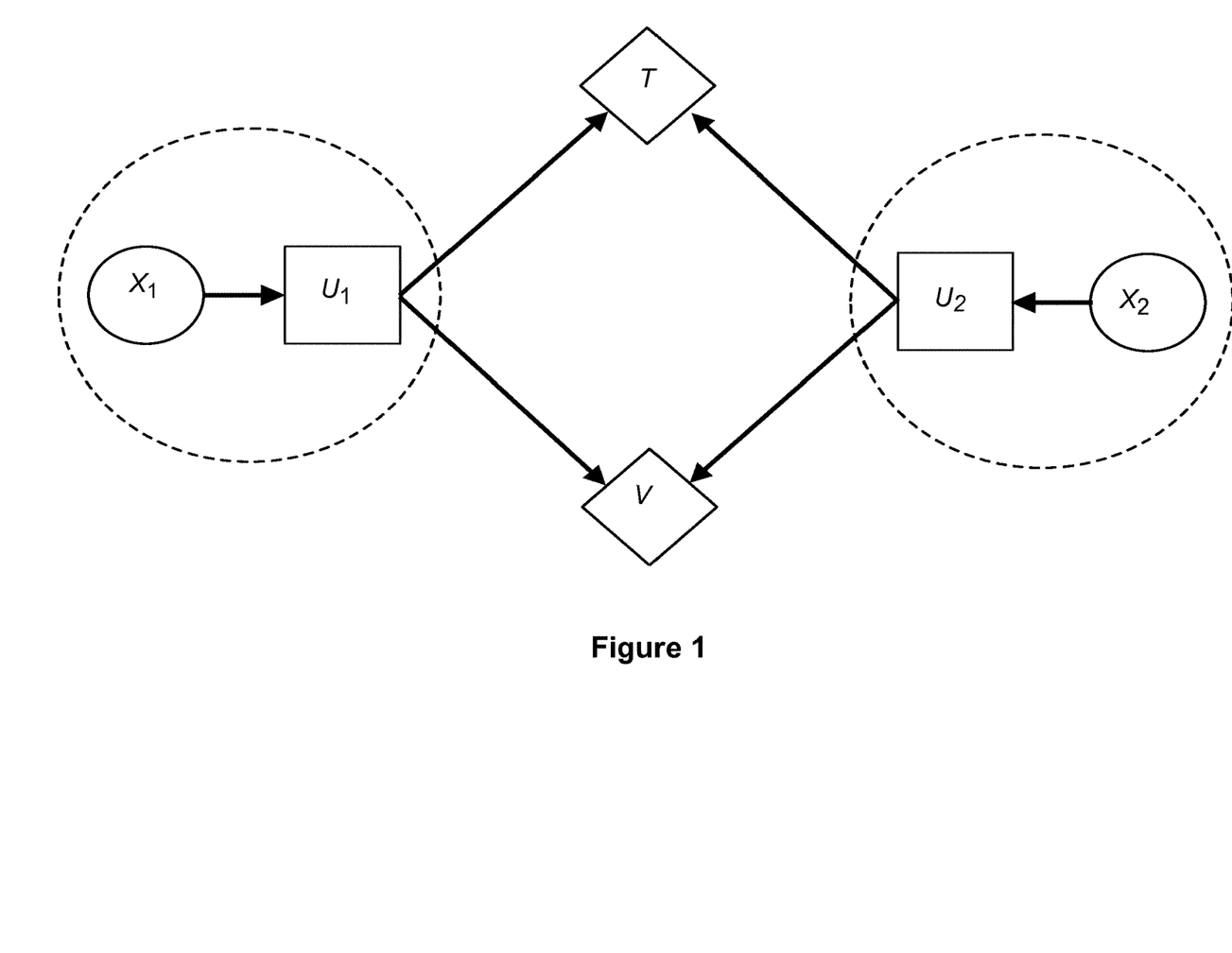
FIG. 1 depicts a physical network, such as a trading or IT or electrical network, or a network of battlefield units. A user $U_i$, for i=1, 2, observes local information $X_i$ and then makes a choice of action with respect to a target (such as a market) T or V.
Figure 2:
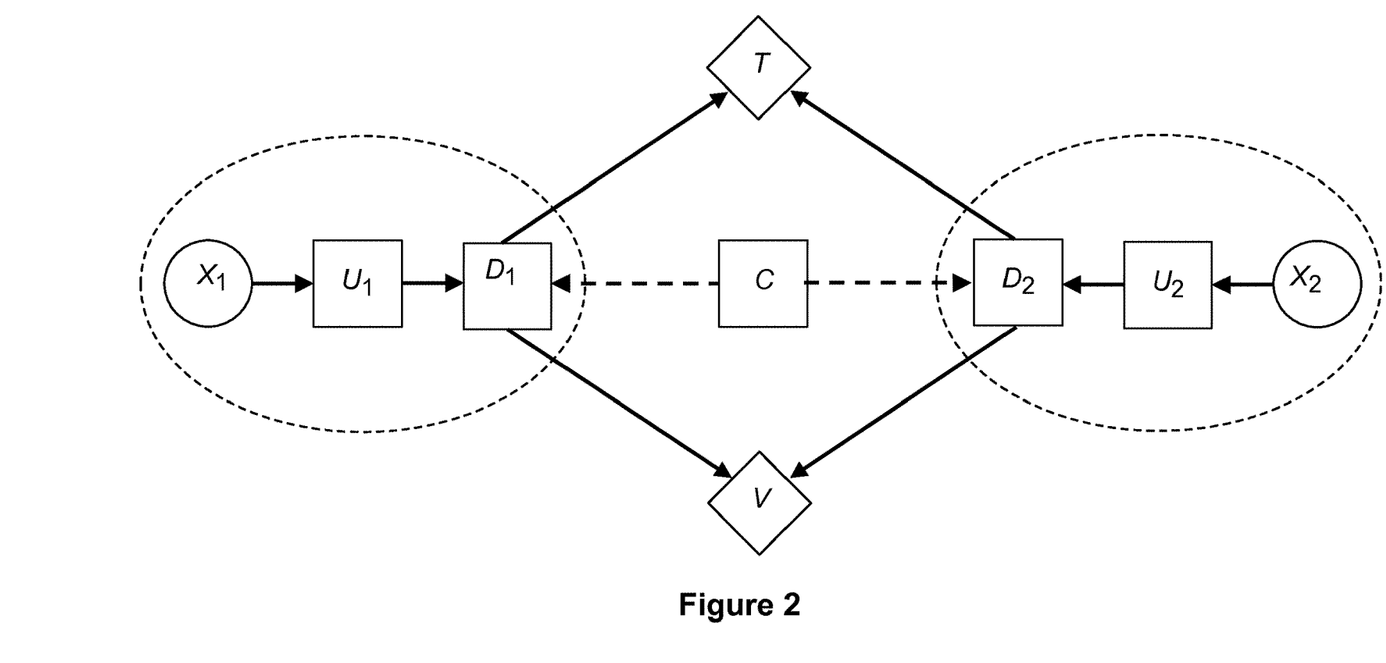
FIG. 2 depicts the same network as in FIG. 1, with the addition of a quantum network, comprising a center C, quantum channels leading to each user location, and detectors $D_i$ at the respective locations.
Figure 3:
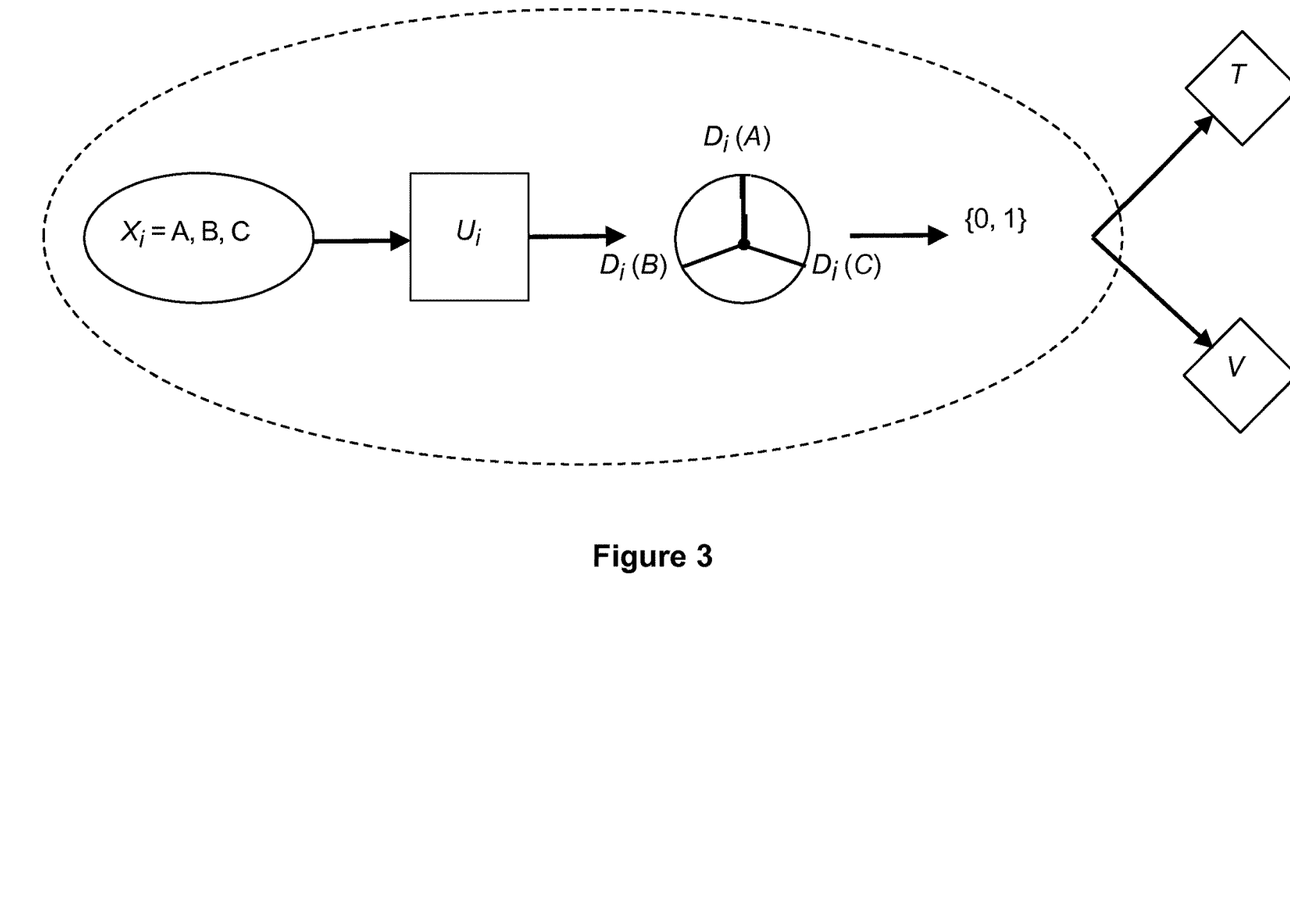
FIG. 3 depicts a method by which a user (e.g., a trader) at a given location, after observing the local information (A, B, or C), configures the detector in a corresponding position ($D_i(A)$, $D_i(B)$, or $D_i(C)$) and takes an action which depends on the outcome of measurement.

FIG. 2 illustrates one exemplary scenario using the system and methods described herein. A user $U_i$, for i=1, 2, first observes local information $X_i$ and then, just prior to deciding on what action to take, configures the detector $D_i$ in a position $D_i(X_i)$ which depends on the local information, and makes the choice of action with respect to a target (such as a market) T or V depend on the outcome of measurement.

Qubits 1 and 2 are distributed on location from a common source through quantum channels.

In one implementation, a system for quantum-assisted load balancing in communication constrained networks comprises a quantum communication network. The quantum communication network comprises a quantum communication center (C) and two quantum detectors (A, B) in communication with the quantum communication center. A quantum bit generator is provided, which may be part of the quantum communication network or separate therefrom and in communication therewith. In one embodiment, the quantum bit generator generates a pair of entangled quantum bits. The quantum communication network is able to distribute entangled quantum bits, generated by the quantum bit generator, from the center to the two detectors, which may be located at physically separate locations. In alternative embodiments more than two detectors may be used, each configured to receive entangled quantum bits. In one embodiment, the quantum communication network provides so that the qubits are received at each detector at pre-defined time intervals (e.g., every millisecond). In a further embodiment having more than two detectors, a pair of entangled quantum bits may be directed to two detectors at a time at pre-defined intervals with the detectors grouped in pairs of two to provide for all combinations of each detector with each other detector over a cycle. Thus, a quantum communication network providing a pair of entangled quantum bits may facilitate quantum communication between more than two locations (each having a detector).

In one embodiment, the two locations may not be equidistant from the center. The distance the quantum bit needs to travel to reach one location maybe less than then distance to the other, resulting in a temporal difference in the detection of each of the pair of entangled quantum bits. One embodiment may utilize a longer than necessary wired connection to provide an equidistant path of travel to both locations, such as utilizing a coiled or otherwise lengthened fiber optic cable to the shorter of the two locations. Further, in one embodiment the non-temporal nature of the quantum relationship of the entangled particles can be utilized. Because of the quantum entanglement, each of the pair of quantum bits does not need to be detected simultaneously or even with regard to the other. As a result, the system may utilize a time period associated with each bit. In such an embodiment, the quantum bits are provided at a regular or predetermined interval and are "active" or used in the decision processes at the respective location for an "active period". This active period effectively serves as a buffer to accommodate the small difference in time for quantum bits to travel to non-equidistant locations. It should be appreciate that the active period can be chosen based upon the difference in travel time between locations and the center. This will ensure, in one embodiment, that all locations are acting based upon on the same pair of entangled quantum particles.

Thus, in a simplified non-limiting example, a first detector A and a second detector B at separate locations receive one bit of an entangled quantum bit pair at a time T. In case two quantum bits are fully entangled, the observed quantum state at time T if the detectors are identically configured will also be identical. For example, where the bit is a photon and thus provide the same measurement. In the example of the traders used throughout, the qubit may be used to determine on which market to trade. It should be appreciated that systems utilizing more than a single bit for more complicated communicated information may also be utilized for assisting more complex coordinated strategies. One embodiment of a quantum communication transmitter and detector arrangement is described in Inagaki, T., et al., "Entanglement Distribution Over 300 km of Fiber," *Optics Express*, 21, 2013, 23241, incorporated herein by reference. In such a setup, one needs a pulsed laser source, a periodically pooled lithium niobate (PPLN) crystal, two strands of single-mode fiber, two configurable polarized filters, and supercooled single-photon detectors. The laser source is located at the center. Each laser pulse excites the PPLN crystal, sparking off two entangled photons, which are then channeled, respectively, into each of the two fiber strands. At the opposite end of each strand, the quantum detector comprises a configurable polarized filter is set in front of each detector (cooled at very low temperature, to avoid thermal noise), which in turn signals if the photon arrived and made it through the filter, thus providing information regarding the quantum state of the photon. It should be appreciated that while the example used herein is of a photon transmitted by fiber optics, as described elsewhere other quantum carriers can be used with the appropriate "wired" or "wireless" communication channel and a quantum detector appropriate for the detection of the type of quantum carrier as well as the respective quantum state that is being used.

The quantum detectors can, in one embodiment, be configurable. Thus, a corresponding quantum detector in each location is configured in a way that depends on the local information. For example, in an optical implementation, a polarized filter set at an angle which depends on local information. Thus, the configured detectors are based upon local information not known to the other location. At each location, the respective quantum bit is measured through the configured detector and the outcome is recorded. Next, an action is taken by each agent depending on the local information and the outcome of the measurement.

Formal Framework

While quantum signals permeate any physical environment, their controlled use as information resources has only recently become possible and implementable. One case in which quantum techniques has already entered the practical arena is quantum cryptography (Scarini V. et al., "The Security of Practical Quantum Key Distribution, *Rev. Mod. Phys.*, 81, 2009, 1301-1350; Qiu, J., "Quantum Communications Leap Out of the Lab," *Nature*, 508, 2014, 441-442), where the security of communication is protected by the very laws of Nature; by contrast, analogous classical schemes do not offer similar guarantees. In computer science, there are important quantum algorithms that have been proved superior to classical algorithms (Deutsch, D., and R. Jozsa, "Rapid Solution of Problems by Quantum Computation," *Royal Society of London Proceedings Series A*, 439, 1992, 553-558; Grover, L., "A Fast Quantum Mechanical Algorithm for Database Search," *Proceedings of the Twenty-Eighth Annual ACM Symposium on Theory of Computing*, 1996, 212-219; Shor, P., "Polynomial-Time Algorithms for Prime Factorization and Discrete Logarithms on a Quantum Computer," *SIAM Journal of Computing*, 26, 1997, 1484-1509). Certain embodiments show that in the area of team decision making, as in cryptography and computing, the availability of quantum resources in a class of team decision problems can lead to improved performance over what is possible in a classical environment.

A team is a group of agents unified by common goals. Characteristic of team problems is that members of a team have access to different information depending on their local environments. Communication of this information among team members may or may not be possible, depending on economic and physical constraints. An example of the latter arises in high-frequency trading (for a survey, see Pagnotta, E., and T. Philippon, "Competing on Speed," April 2015, available at stern.nyu.edu/~tphilipp), where messaging across widely dispersed members of a team would be too slow to be useful. A different example entails situations where communication would reveal something that the team does not want to reveal, such as location of soldiers in a combat situation.

Figure 8:
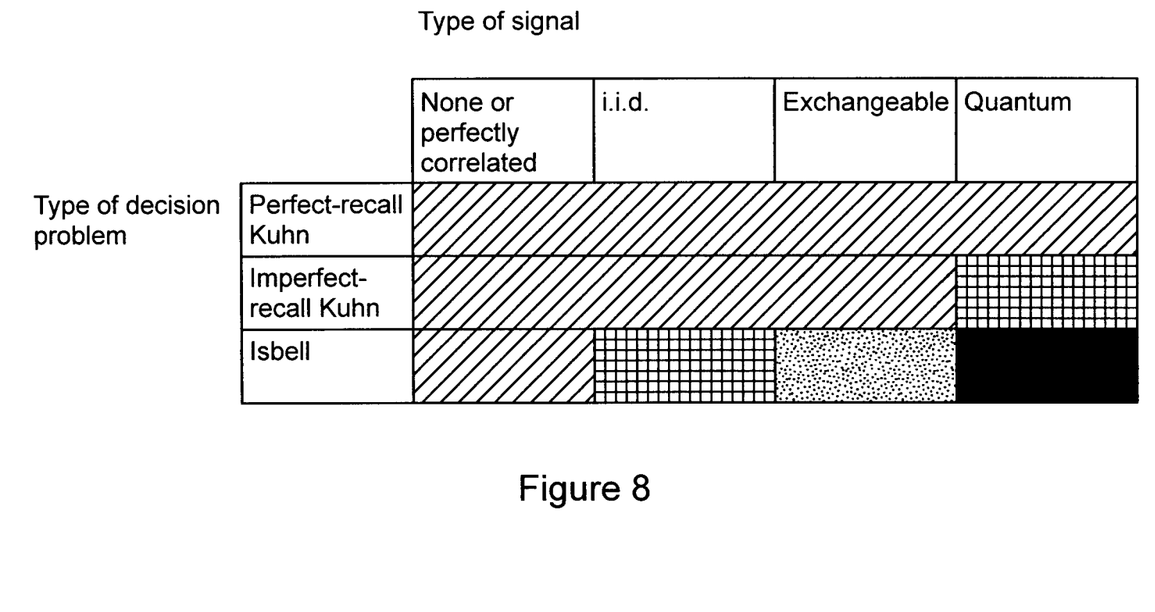
FIG. 8 summarizes how the informational structure of a team problem interacts with the informational properties of the environment to bring about changes in performance.

Herein are described scenarios where direct communication is indeed unavailable, but team members can use a shared global environment involving signals to achieve highly effective coordination. FIG. 8 summarizes how the informational structure of a team problem interacts with the informational properties of the environment to bring about changes in performance. Denoted in lightly hashed slanted patterned boxes is the baseline performance which can be achieved in all types of problem with no signals. Along a given row, higher performance is indicated by moving from light slanted hashing, to heavier plaid hashing to dotted hashing and finally black (as in a heat map). FIG. 8 illustrates a novel approach that allows one to anticipate for a given environment, when improved performance via addition of quantum resources is or is not possible.

The results can be summarized as follows. For perfect-recall Kuhn decision problems, no type of signal brings any improvement over the baseline. For imperfect-recall Kuhn trees, no classical signal type (perfectly correlated, i.i.d., or exchangeable) can improve over the baseline, but quantum signals may do so. For Isbell trees, classical i.i.d. signals improve over the baseline, exchangeable signs improve further, and quantum signals still further. The terminology is explained below. For a detailed treatment, see the technical paper: Brandenburger, A., and P. La Mura, "Team Decision Problems with Classical and Quantum Signals," version Dec. 11, 2014, incorporated herein by reference.

The distinction between perfect and imperfect recall decision problems is due to Harold Kuhn ("Extensive Games and the Problem of Information," in Kuhn, H., and A. Tucker (eds.), *Contributions to the Theory of Games*, Vol. II, Annals of Mathematics Study, 28, 1953, Princeton University Press, 193-216). John Isbell (Isbell, J., "Finitary Games," in Drescher, M., A. Tucker, and P. Wolfe (eds.), *Contributions to the Theory of Games*, Vol. III, Annals of Mathematics Study, 39, 1957, Princeton University Press, 79-96) extended this classification further to include other trees with limited recall, which do not belong to the family of Kuhn trees. This terminology and classification refers to the availability or unavailability of information about what team members do or know. The relevant real-world team problem can be mapped to one of the three rows in the table in FIG. 8, as just defined.

The different kinds of signals to which members of a team might have access must also be considered, since this, too, affects the team's potential performance in a task. In one embodiment, a framework is provided for consideration of the different signals, especially to specify the physical embodiment of the signals that are available. What correlations across signals are possible fundamentally depends on whether the signal carrier obeys classical or quantum physical laws. There is also a question of whether there is one or more signal per information set in the decision tree. (An information set describes the information available to a particular agent at the point of decision.) The simplest case is one signal, but there are cases where the different nodes in a given information set are widely separated from one another in space or time. In such cases, it may be more appropriate to think of distinct but perfectly correlated signals operating at different nodes within the same information set. In fact, other assumptions on signals are possible that still preserve the indistinguishability of nodes in an information set. In particular, the signals could be i.i.d., but, more generally, these can be exchangeable. (Two random variables are exchangeable if their joint distribution is invariant under permutation.) The columns of the table in FIG. 8 describe these different signal structures.

Quantum Improvement

In one non-limiting example, it can be seen that one embodiment of the invention using a quantum network, as described herein, enables a team to achieve higher performance. Formally, this example belongs in the lightly hashed cell in the second row of the table in FIG. 8. This is a typical setting for decentralized strategies in a team.

Figure 4:
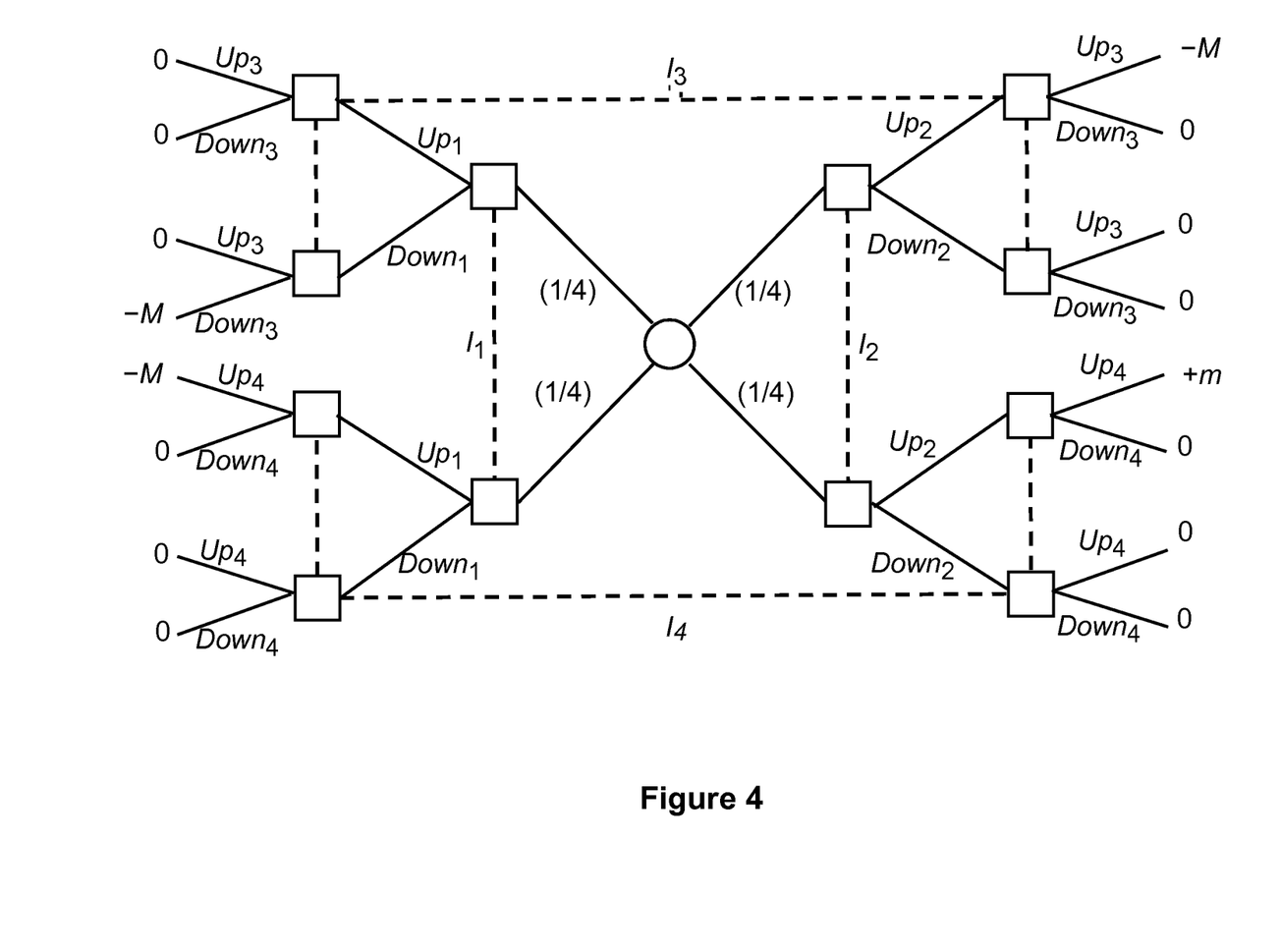
FIG. 4 depicts a situation in which two team members are imperfectly informed of an initial move by Nature (a chance move, depicted by the open node) and must coordinate their actions.

The decision tree of FIG. 4 depicts a situation in which two team members are imperfectly informed of an initial move by Nature (a chance move, depicted by the open node) and must coordinate their actions. It is assumed that the payoffs satisfy $0<m<M$. The team's expected payoff with classical signals is at most 0. This can be seen by ignoring the signals in FIG. 4. Observe that the only way for the team to get the +m payoff (with positive probability) is if it chooses $Up_2$ at information $I_2$ and $Up_4$ at information set $I_4$. But then, to avoid the −M payoff on the right side of the tree, it must choose $Down_3$ at $I_3$. Then, to avoid the upper −M payoff on the left side, it must choose $Up_1$ at $I_1$. Then, to avoid the lower −M payoff on the left side, it must choose $Down_4$ at $I_4$, not $Up_4$ as needed at information $I_2$ and $Up_4$. It follows that the +m payoff cannot arise unless at least one −M payoff also arises. Moreover, it will arise with the same probability. Since $M>m$, we have shown that the team's expected payoff is at most 0. Proposition 5.2 in Brandenburger and La Mura (Brandenburger, A., and P. La Mura, "Team Decision Problems with Classical and Quantum Signals," version Dec. 11, 2014) States "Fix a Kuhn tree. The highest expected payoff a team can achieve with signals satisfying classicality is the same as that without signals. Thus, from that proposition it can be concluded that the team's highest possible expected payoff in any extended tree with classical signals is also 0.

Figure 5:
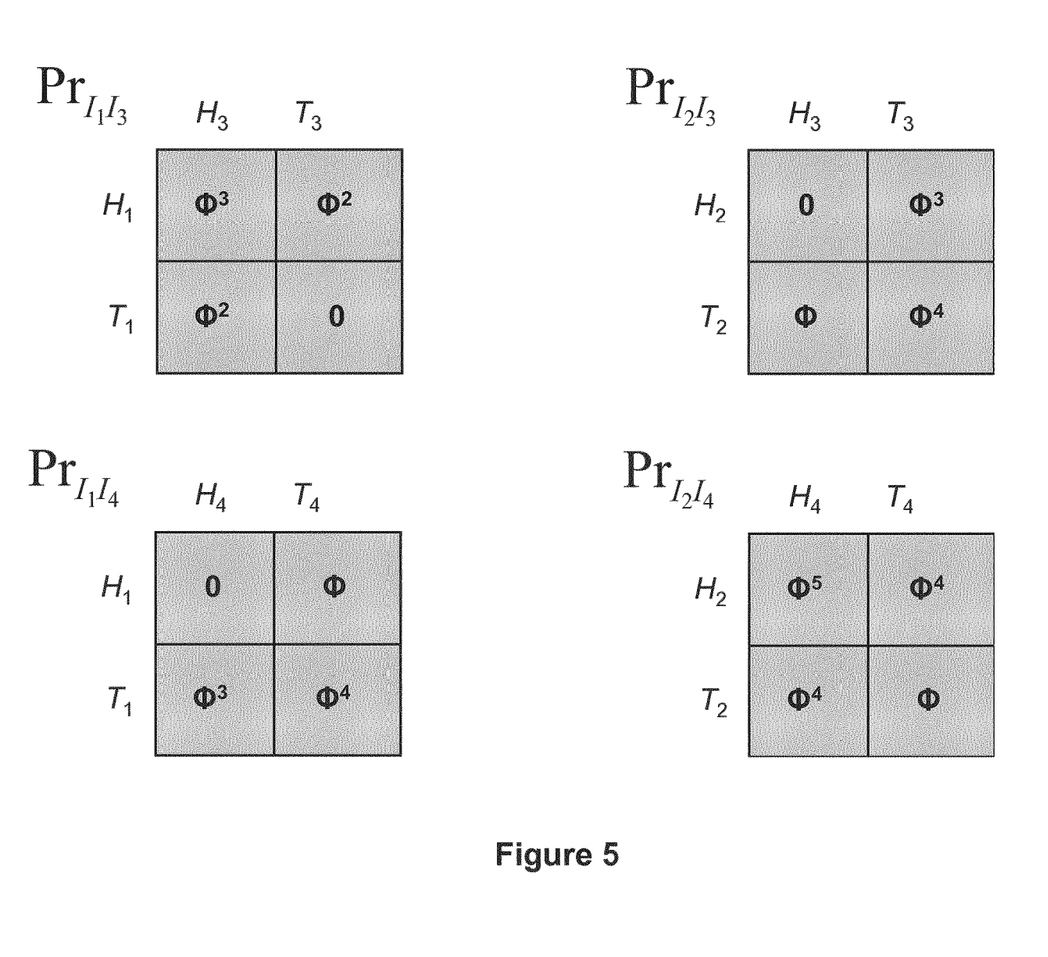
FIG. 5 illustrates a signal structure.

The next step is to add the signal structure of FIG. 5. Here, $\phi=2/(1+\sqrt{5})$ and is the inverse of the Golden Ratio. Consider the following strategy profile for the team in the extended tree: (i) at $I_1$, choose $Up_1$ after $H_1$ and $Down_1$ after $T_1$; (ii) at $I_2$, choose $Up_2$ after $H_2$ and $Down_2$ after $T_2$; (iii) at $I_3$, choose $Up_3$ after $H_3$ and $Down_3$ after $T_3$; (iv) at $I_4$, choose $Up_4$ after $H_4$ and $Down_4$ after $T_4$. The team's expected payoff from this strategy profile is $\frac{1}{4}\times\phi^5\times m>0$. An improvement in the team's highest expected payoff is achieved.

Proposition 5.2 in Brandenburger and La Mura establishes that the signal structure of FIG. 5 cannot be realized classically, as the highest payoff is the same for a classic communication scenario as if there is no signaling. It can, however, be realized quantum mechanically. The physical mechanism involves the creation of what is called an entangled pair of particles. The basic set-up is that two particles—two photons, for example—are prepared in a special state and sent off on different trajectories. Each particle then enters a quantum detector, placed some distance from the source on that particle's trajectory. Detectors have various settings, and the setting chosen determines which property of a particle is measured. For example, a detector might be set to measure the so-called spin of a photon along a particular direction. The outcome of each measurement is binary and can take one of two values, conventionally labeled spin +1 or spin −1.

Such a quantum system can be used to generate the signal structure of FIG. 5. The spin of one particle is measured at information set $I_1$ or $I_2$. It is measured along one direction at $I_1$ and along a different direction at $I_2$. In either case, the measurement has two possible outcomes. Referred to as $Heads_1$ or $Tails_1$, and $Heads_2$ or $Tails_2$, respectively. The spin of the second particle is measured at information set $I_3$ or $I_4$. It is measured along one direction at $I_3$ and along a different direction at $I_4$. Again, in either case, the measurement has two possible outcomes. Referred to as $Heads_3$ or $Tails_3$, and $Heads_4$ or $Tails_4$, respectively. This gives us the form of the signal structure of FIG. 5. The specific probabilities come from the preparation of a particular entangled quantum state (Hardy, L., "Nonlocality for Two Particles without Inequalities for Almost All Entangled States," *Physical Review Letters*, 71, 1993, 1665-1668; Mermin, N. D., "Quantum Mysteries Refined," *American Journal of Physics*, 62, 1994, 880-887).

Financial Markets Setting Example

An important setting in which team problems arise but direct communication is impossible is high-frequency trading in finance. Consider two traders (Ann and Bob) implementing high-frequency strategies on two markets (1 and 2). The traders are far apart from each other and from the two markets. The distances are such that communication between the two traders prior to their trading decisions is too slow. For example, consider two markets located in New York and Shanghai, respectively. Typically, a new trade is accepted every 0.5 millisecond by the stock exchange servers. Even at the speed of light, communication between the two locations takes approximately 40 milliseconds. Thus, any information about prices on one exchange is already out of date once it reaches the other exchange, making classical arbitrage impossible. Moreover, the slow speed of communication renders other financial strategies impossible, as the following example illustrates.

Both traders are involved in local high-frequency hedging strategies. There are three assets X, Y, and Z, and, at each point in time, each trader needs to sell one of the three assets (chosen with equal probability) against the other two. When Ann and Bob want to sell the same asset, they do better trading on separate markets, in which case they get payoffs of 0 (a normalization), rather than on the same market, where they would directly compete against each other and get payoffs of −M. When Ann and Bob want to sell different assets, they do better trading on the same market since each increases the demand for the asset the other wants to sell. This yields both a payoff of +m, as compared with 0 if they trade on separate markets. We assume m<M. (This inequality makes sense since even if they sell different assets, they still compete in purchasing the third one. With these parameter ranges, the set-up is similar to the example of a team decision problem in La Mura, P., "Correlated Equilibria of Classical Strategic Games with Quantum Signals," *International Journal of Quantum Information*, 3, 2005, 183-188.)

If M is sufficiently large compared with m, any good pair of strategies for the traders must preclude their selling the same asset on the same market. In fact, the following is optimal for the traders (without quantum resources). Ann goes to market 2 only when she needs to sell asset Z, while Bob goes to market 1 only when he needs to sell Z. (By symmetry, we can replace Z by X or Y, and market 2 with market 1.) To calculate the resulting expected payoff to the traders, note that there are nine equally likely cases according to whether Ann wants to sell asset X, Y, or Z, and similarly for Bob. In four of these cases, the above strategy profile secures a payoff of +m, and otherwise 0. So, the expected payoff is 4/9×m. This is under the assumption of no signals, but, since the scenario corresponds to a Kuhn tree with imperfect recall, it is known from Proposition 5.2 in Brandenburger and La Mura cited above that the addition of classical signals cannot improve the baseline payoff.

Now bring in quantum information resources. Specifically, in one embodiment the traders are provided access to an entangled quantum system on which they can make certain measurements and thereby condition their choices. Specifically, one embodiment uses a system that is prepared in the so-called Bell state (Bell, J., "On the Einstein-Podolsky-Rosen Paradox," *Physics*, 1, 1964, 195-200). This gives rise to the signal structure shown in FIG. 6.

Figure 6:
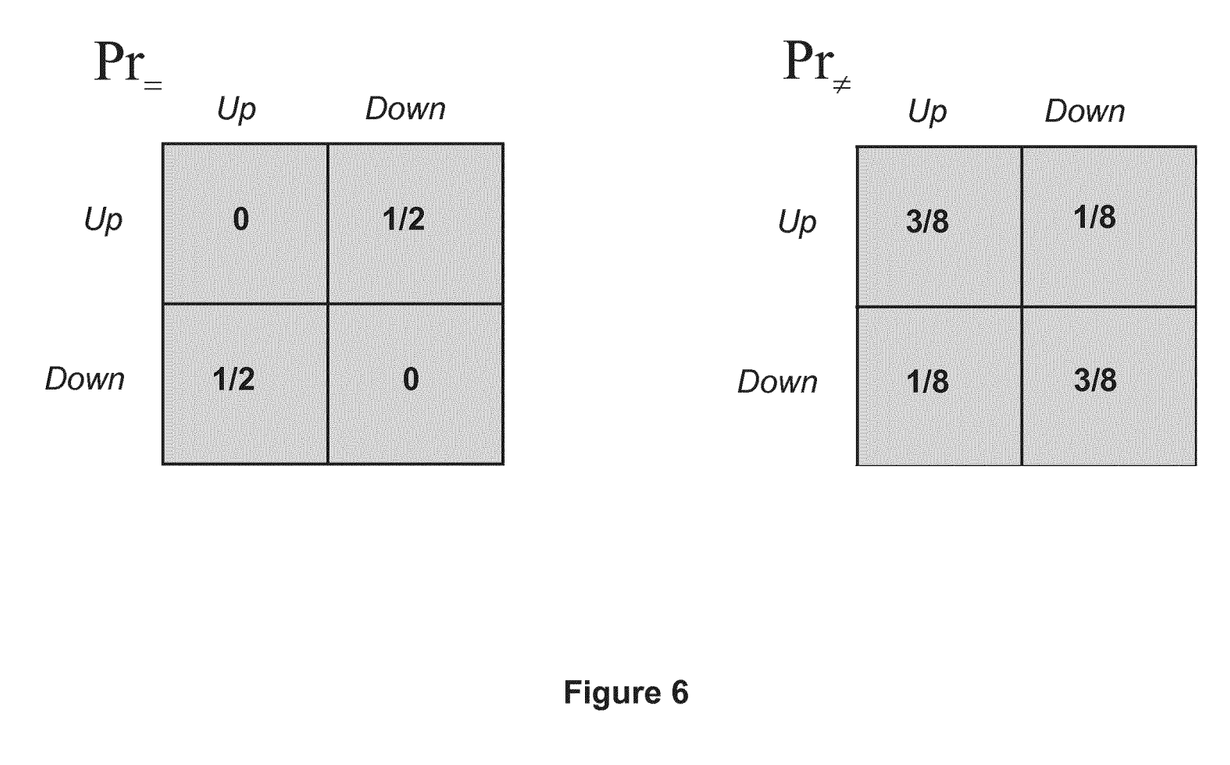
FIG. 6 illustrates another signal structure, this structure for system in the Bell state.

Each trader chooses one of three possible local measurements on the system, which, for convenience, are labeled X, Y, or Z. The left-hand table in FIG. 6 gives the probabilities of the joint outcomes (each outcome can be Up or Down) when the traders make the same choice of measurement, and the right-hand table in FIG. 6 gives the probabilities when they make different choices of measurement. Consider the following strategy for Ann. If she wants to sell X, then she performs measurement X and, if she observes Up, she executes the trade on market 1, while if she observes Down, she executes the trade on market 2. Similarly, if Ann observes Y or Z, she performs the corresponding measurement and acts accordingly. Bob adopts the same strategy. The expected payoff is calculated as follows. These strategies always avoid selling the same asset on the same market. Moreover, in each of the six cases where the traders want to sell different assets, they manage, with probability 3/8+3/8=3/4, to trade on the same market. This leads to an expected payoff of 6/9×3/4×m=12×m, which is greater than the baseline payoff.

To illustrate further how two traders Ann and Bob can benefit from such a scheme, consider one embodiment of a quantum communication system, having:
  a quantum communication network, comprising a quantum communication center (C) and two trader locations (A and B) linked to it. The quantum communication network is able to distribute entangled quantum bits from the center to the two trader locations so that the qubits become available to the traders at pre-defined time intervals (e.g., every millisecond)
  a connection to a financial network. In one embodiment, the financial network comprises four separate but interlinked locations (two markets and two trader locations (A and B))
  a quantum bit generator at the quantum communication center location C, capable of producing quantum bit pairs in a configurable joint state
  a configurable detector at each of the two trader locations A and B, capable of observing a quantum bit outcome (e.g., spin) in an arbitrary configuration (e.g., spatial orientation of the measurement apparatus relative to the quantum bit)
In an embodiment with the above structure, the system utilizes a process that runs as follows:
  at C, the quantum communication center, an entangled quantum bit pair is produced and, with one of each bit of the pair distributed each to the A and B locations via the quantum communication network at A, Ann configures her quantum communication detector in one of three positions depending on which of three assets she intends to sell, and Bob does similarly at B. There is no need for communication between Ann and Bob, because the quantum information they are acting on is entangled, thus providing both with correlated information provided by the quantum communication center.

Ann observes the outcome of her quantum bit, and chooses a market accordingly (e.g., Ann and Bob may have agreed on the convention that observing spin down means going to market 2), and Bob obverses his quantum bit, which because they bits are entangled will exhibit a corresponding outcome Distributed Battlefield Example As described above, communications can be constrained in situations where the cost to such communication is too high. For example, a military unit would provide information regarding their location, potential to enemy combatants, when engaging in communication of classical information such as transmitting via radio frequencies. In one embodiment, a quantum communication system provides quantum information, such as a quantum bit to a military unit in the field. For example, a satellite can transmit quantum information to an area that is then receivable and decipherable by the unit. In another embodiment, one or more military units may be provided with one of a pair (or higher order) of entangled quantum bits. These quantum bits are stored in a storage medium, allowing the military unit to enter into hostile area without needing to exchange communication. For example, the unit can observe the outcome of their quantum bit and go to extraction point A with a spin down or extraction point B with a spin up.

Figure 7:
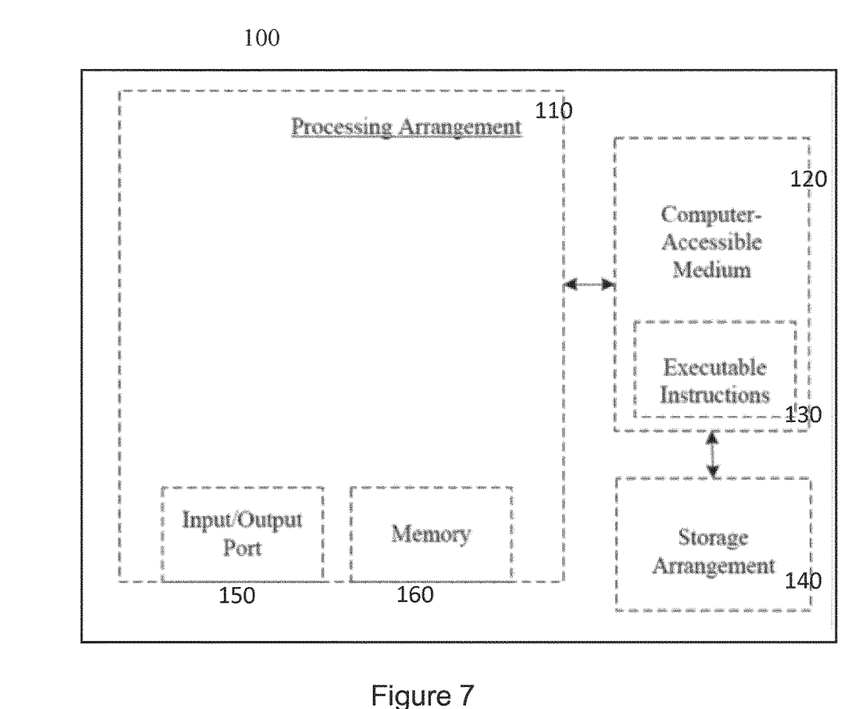
FIG. 7 illustrates a computer system for use with certain implementations.

As shown in FIG. 7, e.g., a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example.

System 100 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Moreover, we also make use of a quantum communication network, with a structure that is well understood both in the laboratory and as a commercial application (e.g., as in quantum cryptography). Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a combined quantum-classical communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. A computer-assisted quantum communication system for facilitating communication-constrained distributed decision making, comprising:
   a quantum signal transmitter configured to transmit a carrier of quantum information;
   a qubit generator in communication with the quantum signal transmitter, the qubit generator configured to generate a first quantum carrier and a second quantum carrier, which are entangled;
   a first local quantum communication system comprising a first processor and a first quantum signal receiver in communication with the quantum signal transmitter and a first polarized filter to set a first local quantum angle and further comprising the first processor and a first non-transitory computer-readable medium configured to:

process the first carrier of quantum information;

identify a first outcome of a first local measurement of a quantum state of the first carrier of quantum information; and determine a first location action based upon the first outcome;

a second local quantum communication system, located remote from the first local quantum communication system comprising a second processor and a second quantum signal receiver in communication with the quantum signal transmitter and a second polarized filter to set a second local quantum angle and further comprising the second processor and a second non-transitory computer-readable medium configured to:

process the second carrier of quantum information;

identify a second outcome of a second local measurement of a quantum state of the second carrier of quantum information; and determine a second location action based upon the second outcome;

wherein the first local measurement and the second local measurement are different when measured about a same axis.

2. The system of claim 1, wherein the quantum signal transmitter is in classical communication with the first quantum signal receiver and the second quantum signal receiver.

3. The system of claim 1, wherein the carrier of quantum information is selected from the group consisting of: elementary particles, atoms, molecules, nanostructures, electron holes and quasiparticles.

4. The system of claim 1, wherein determining the first location action and the second location action comprises selecting a parameter for a financial transaction.

5. The system of claim 1, wherein the quantum signal transmitter comprises a laser configured to excite a periodically pooled lithium niobate crystal.

6. The system of claim 5, where the first quantum signal receiver comprises the first polarized filter associated with a single-photon detector.

7. A system for facilitation of communication-constrained distributed decision making, including high-speed trading, bidding, and routing, the system comprising:

a quantum signal transmitter configured to transmit a plurality of quantum bits;

a plurality of quantum receivers capable of measuring an outcome of each of the plurality of quantum bits, the plurality of quantum receivers comprising at least a first quantum receiver associated with a first polarized filter located at a first location and a second quantum receiver associated with a second polarized filter located at a second location separate from the first location;

each of the plurality of quantum receivers configurable to measure one of a plurality of quantum properties based upon an angle selected for the first polarized filter and the second polarized filter;

a plurality of quantum channels, capable of distributing one of a set of entangled quantum bits to each of the plurality of quantum receivers on location, wherein:

the first quantum receiver at the first location and the second quantum receiver at the second location measure anti correlated quantum states such that users execute strategies depending on local information of each user and on the outcome of measurement at a respective location.

8. The system of claim 7, further comprising a temporary storage configured to store the plurality of quantum bits.

9. The system of claim 7, wherein the outcome measured is state of polarization of a photon.

10. The system of claim 7, wherein the measured anti correlated quantum states are of spin of an electron.

11. The system of claim 7, wherein the outcome measured is determined by observing a physical state of a carrier of quantum information.

12. The system of claim 7, wherein the plurality of quantum bits are selected from the group consisting of: elementary particles, atoms, molecules, nanostructures, electron holes and quasiparticles.

13. The system of claim 7, wherein the quantum signal transmitter comprises a laser configured to excite a periodically pooled lithium niobate crystal.

14. The system of claim 13, wherein each of the the first polarized filter and the second polarized filter is associated with a single-photon detector.

\* \* \* \* \*